F. E. ABBOTT.

COMBINED RAILROAD RAIL AND RAIL BASE PLATE.

APPLICATION FILED JUNE 19, 1909.

Reissued Nov. 4, 1913. 13,637.

WITNESSES:
J. R. Millevard
M. L. Breslin

INVENTOR
Franklin E. Abbott.
BY
Alfred Wilkinson
ATTORNEY

COLUMBIA PLANOGRAPH CO., WASHINGTON, D. C.

UNITED STATES PATENT OFFICE.

FRANKLIN E. ABBOTT, OF BUFFALO, NEW YORK.

COMBINED RAILROAD-RAIL AND RAIL-BASE PLATE.

13,637. Specification of Reissued Letters Patent. Reissued Nov. 4, 1913.

Original No. 857,781, dated June 25, 1907, Serial No. 335,955. Application for reissue filed June 19, 1909. Serial No. 503,260.

*To all whom it may concern:*

Be it known that I, FRANKLIN E. ABBOTT, a citizen of the United States, residing at Buffalo, county of Erie, and State of New York, have invented a new and useful Improvement in a Combined Railroad-Rail and Rail-Base Plate, of which the following is a specification.

This invention relates to railway rails, and its object is to provide a rail having the weight very little greater and the same general shape above the flange as standard rails, but one which is balanced as to heads and base and whose strength in the base portion is greater than that of standard forms of rails in use in the United States.

The standard form of railroad rail in use in the United States is of general T form, having a web, a thick, comparatively narrow head, and a thin and comparatively wide base, the latter being flat on its bottom and the flanges having sloping upper faces, said flanges tapering to comparatively thin edges. This form of rail necessitates parting the pass of the reducing rolls at the center of the head and at one edge of the base. Consequently the base portion does not receive any appreciable pressure on the lower face and the edge pressure is not symmetrical. Strains are necessarily set up in the metal. Furthermore, the section is not balanced but there is more metal in the head than in the base; hence, in cooling it bends considerably, making it necessary to camber the same and after it is cool to straighten it. In straightening the same the jaws or "gag" of the straightening press contacts across the entire width of the base, and if the base is not true, heavy strains may be exerted near one or the other edge of the base, thus producing heavy strains at the junction of the base flanges and web. Due to these and other causes, standard forms of railroad rails fracture most frequently at the junction of the web and base flanges, or a line at *a*, Figure 1.

The object of this invention is to overcome this element of weakness and still have a rail of substantially standard form.

The invention consists of a combined rail and rail base plate, the former being of standard form, except for the base, which is reinforced at the point of usual weakness and the plate providing a seat or support for such rail.

Figure 1:
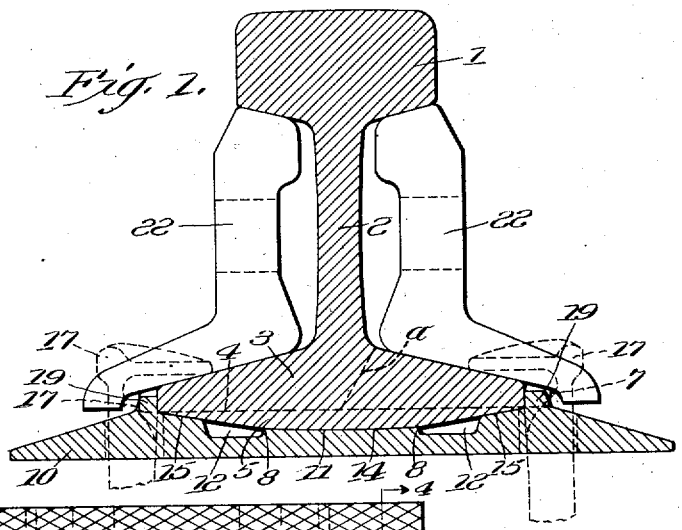
Figure 3:
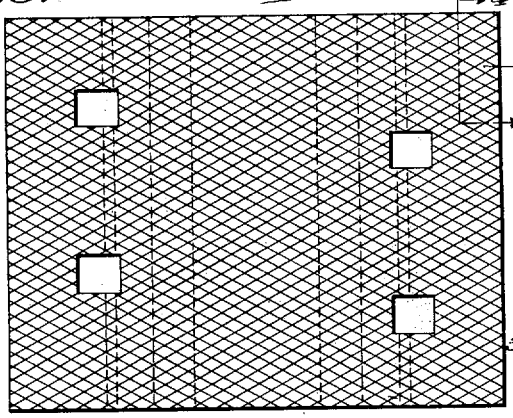
Figure 4:
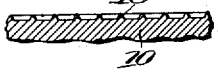
Figure 5:
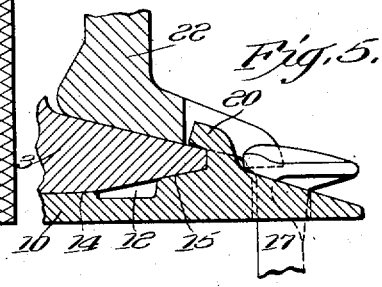
Figure 2:
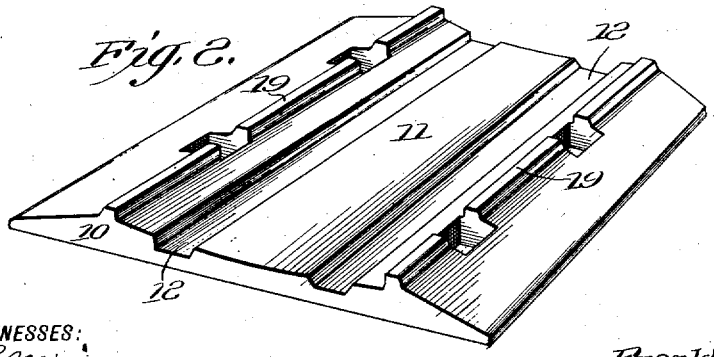

In the accompanying drawing, Fig. 1 is a section through my improved rail and rail base plate; Fig. 2 is a perspective view of the base plate; Fig. 3 is a bottom plan view thereof; Fig. 4 is a sectional detail on the line 4—4, Fig. 3; and Fig. 5 is a sectional detail showing a modification.

My rail has a head 1, web 2, and base 3, the head and web being of standard form, and the base 3 differing from standard form only in the fact that it is narrower and reinforced on the bottom. The dotted line 4 indicates the lower face of the usual rail base, and the metal 5 below this line is what I add in order to reinforce the rail at its usual point of weakness. I make said base narrower than standard forms. The dotted lines 7 indicate the width of the usual rail bases, and the metal saved at the edges of the base of my rail goes into the reinforcement on the bottom, so that the section is only a few pounds per yard heavier than standard sections. The lower face of the base is straight from the edges to the points 8, and is curved between said points, and the whole is substantially convex. This section of rail can be produced on rolls whose passes are divided at the centers of both the head and base. As a consequence the base receives uniform pressure on all parts, while the convexity of the lower face enables the edges of the roll passes to be sloping, thus exerting an inward pressure directly on the lower face and compacting the metal in a manner impossible with present forms of rails. As a result, the rail base has no internal strains and is also more compact and hence stronger than old forms of rails. Furthermore, the section is balanced, *i. e.* there is as much metal in the base as in the head, and hence in cooling it will not curve nearly so much as standard forms, and the straightening is reduced to a mininum with a consequent reduction in internal strains. Furthermore, in straightening the same, the jaw or "gag" of the straightening press bears only on the highest or central portion of the convex base, so that there is not the danger of starting fractures or placing undue strains at the juncture of the base flanges and web. This form of rail effectually overcomes the weakness in standard forms. This rail may, if desired, be seated directly in suitable seats cut in the ties, but preferably I employ with the same a rail base plate 10 having a flat lower face to seat on the tie, and having in its upper face a seat 11 which is the counterpart of the rail base and takes the load directly at the middle of the rail. This plate preferably is grooved at both sides of the center of its rail seat, as shown at 12, thus giving the thinnest sections at these grooves. As a consequence, in case the plate and rail base should not fit accurately, the plate will yield along these grooves, thereby insuring contact of the rail along the center line of the section and preventing strains at the junctures of the base flanges and web. At the same time the rail is firmly supported not only at its middle as at 14, but also at its edges, as at 15. This base plate is much wider than the rail base, even standard bases, and hence reduces the tendency of the rail to roll.

Preferably the plate has a roughened lower face, as shown at 16, Figs. 3 and 4, this preferably being of irregular design, such as may be produced by chisel marks on the surfaces of the reducing rolls. This roughness aids the spikes 17 in keeping the plate from moving on the tie. The plate is provided with a rib 19 on each side of the rail seat, with which ribs the edges of the base flanges contact. Consequently the plate acts also as a gage to preserve the gage of the track. On curves the plate will preferably have its inner rib projected to overhang the rail base, as shown at 20, Fig. 5, which prevents this edge of the base from rising on the outward thrust of the train and consequently prevents the rail from rolling, thus serving the function of the usual brace placed on the outside of the rail on curves. The spike in this case does not contact with the rail base and is not affected by the vertical movement of the rail.

The rail described is of substantially the form of standard rails so that it can receive standard fish or joint plates 22, and since the base plate can be seated on any tie, the rail and base plate can be readily substituted for the ordinary rails. Both the rail and base plate are bi-laterally symmetrical, and hence can be applied either end to.

What I claim is:—

1. A combined rail and rail base plate, comprising a rail having a comparatively wide base convex on its lower face, and a base plate provided with a counterpart rail seat.

2. A combined rail and rail base comprising a rail having a comparatively wide base convex on its lower face, and a base plate provided with a counterpart rail seat and with longitudinal grooves in said seat.

3. A combined railroad rail and rail base plate, comprising a rail having a comparatively wide base convex on its bottom, and a base plate having a counterpart seat provided with longitudinal grooves and having ribs at the sides of the seat to contact with the edges of the rail base.

4. A combined railroad rail and rail base plate, comprising a rail having a comparatively wide base convex on its bottom, and a base plate having a counterpart seat and provided on one edge with a rib overhanging the edge of the base.

5. The combination with a railroad rail having a flange convex on its lower face, of a base plate having its upper surface concave to fit and receive said convex flange and having on one side a shoulder to engage with the edge of the rail flange and only with the flange near its edge.

6. A base-plate for railroad rails, comprising a flat base adapted to rest flat on the tie and parallel ribs upwardly extending from the upper surface of the base to receive between them the rail flange and to engage with the edges, one of said ribs being curved to overhang the flange edge, said ribs being arranged inwardly of the base plate outer edges leaving outer portions of the base plate outwardly extending beyond the ribs, the upper surfaces of said outer portions being beveled from the base of the ribs outwardly and downwardly to comparatively a thin edge.

7. A base-plate for railroad rails, comprising a flat base adapted to rest flat on the tie and parallel ribs upwardly extending from the upper surface of the base to receive between them the rail flange and to engage with the edges, one of said ribs being curved to overhang the flange edge, said ribs being arranged inwardly of the base plate outer edges leaving outer portions of the base plate outwardly extending beyond the ribs, the upper surfaces of said outer portions, immediately adjacent to the ribs, being level with the upper surface within the ribs, but beveled from said point adjacent to the ribs outwardly and downwardly.

8. A base-plate for railroad rails comprising a flat, thin base to sit on the tie, parallel ribs on its upper surface spaced to receive between them the rail-flange, one of said ribs being curved to overhang the flange, the upper surface of said base between the ribs being provided with longitudinal grooves extending from end to end and respectively adjacent one of the flanges, the base in the grooves being imperforate, the portion of the base between the grooves being continuous to engage with the rail base, and the base-plate being formed with spike holes outside of the grooves.

In testimony whereof, I have signed my name to this specification, in the presence of two subscribing witnesses.

FRANKLIN E. ABBOTT.

Witnesses:
J. R. MILLWARD,
M. L. BRESLIN.

Copies of this patent may be obtained for five cents each, by addressing the "Commissioner of Patents, Washington, D. C."